US006603551B2

(12) United States Patent
Mestha et al.

(10) Patent No.: US 6,603,551 B2
(45) Date of Patent: Aug. 5, 2003

(54) COLOR MEASUREMENT OF ANGULARLY COLOR VARIANT TEXTILES

(75) Inventors: Lalit K. Mestha, Fairport, NY (US); Fred F. Hubble, III, Rochester, NY (US); Tonya L. Love, Rochester, NY (US); Daniel A. Robbins, Williamson, NY (US); Gary W. Skinner, Rochester, NY (US)

(73) Assignee: Xerox Corporation, Stamford, CT (US)

(*) Notice: Subject to any disclaimer, the term of this patent is extended or adjusted under 35 U.S.C. 154(b) by 10 days.

(21) Appl. No.: 09/994,666

(22) Filed: Nov. 28, 2001

(65) Prior Publication Data

US 2002/0191189 A1 Dec. 19, 2002

Related U.S. Application Data

(63) Continuation-in-part of application No. 09/862,945, filed on May 22, 2001.

(51) Int. Cl.[7] .................................................. G01J 3/46
(52) U.S. Cl. ....................... 356/402; 356/425; 356/419; 356/416; 250/226
(58) Field of Search ..................... 356/402, 405–407, 356/416, 419, 425, 420; 250/226; 347/19

(56) References Cited

U.S. PATENT DOCUMENTS

| | | | |
|---|---|---|---|
| 3,910,701 A | 10/1975 | Henderson et al. ........... 356/39 |
| 4,553,033 A | 11/1985 | Hubble, III et al. ......... 250/353 |
| 4,989,985 A | 2/1991 | Hubble, III et al. ......... 356/445 |
| 5,078,497 A | 1/1992 | Borton et al. ................ 356/446 |
| 5,137,364 A | 8/1992 | McCarthy .................... 356/402 |
| 5,272,518 A | 12/1993 | Vincent ....................... 356/405 |
| 5,377,000 A | * 12/1994 | Berends ........................ 356/73 |
| 5,526,190 A | 6/1996 | Hubble, III et al. ......... 359/719 |
| 5,671,059 A | 9/1997 | Vincent ....................... 356/402 |
| 5,748,221 A | 5/1998 | Castelli et al. .............. 347/232 |
| 5,838,451 A | 11/1998 | McCarthy .................... 356/406 |
| 5,844,680 A | 12/1998 | Sperling ...................... 356/303 |
| 5,963,333 A | 10/1999 | Walowit et al. .............. 356/425 |
| 6,020,583 A | 2/2000 | Walowit et al. .............. 250/226 |
| 6,147,761 A | 11/2000 | Walowit et al. .............. 356/425 |
| 6,157,454 A | 12/2000 | Wagner et al. ............... 356/407 |

* cited by examiner

*Primary Examiner*—John Juba
*Assistant Examiner*—Fayez Assaf (57) ABSTRACT

A method is provided for measuring the color of irregular surface materials, including textiles which may provide dissimilar color measurements from different viewing angles, by illuminating a sampling area of the irregular surface material approximately perpendicularly thereto and measuring the color reflected from that area at a substantial angle, preferably about 45 degrees, with a plurality of separate photodetectors arrayed circularly around the illuminated sampling area of irregular surface material to receive the reflected illumination from substantially opposing directions and at a substantial angle to the illuminated area, for providing a more accurate yet lower cost color measurement system for textiles that can be used easily, quickly, and uncritically in terms of the handling, positioning and orientation of the textile material being tested.

10 Claims, 7 Drawing Sheets

COLOR MEASUREMENT OF ANGULARLY COLOR VARIANT TEXTILES

This is a Continuation-in-Part of U.S. appln. Ser. No. 09/862,945 filed May 22, 2001 by Fred F. Hubble, III, Tonya L. Love and Daniel A. Robbins entitled "Angular, Azimuthal and Displacement Insensitive Spectrophotometer for Color Printer Color Control Systems".

Cross-reference and incorporation by reference is made to the following additional copending, commonly assigned, and commonly owned at the time of their Invention U.S. patent applications and patents: appln. Ser. No. 09/862,247 filed May 22, 2001 by Jagdish C. Tandon and Lalit (then Lingappa) K. Mestha appln. Ser. No. 09/867,042 filed May 22, 2001 by Jagdish C. Tandon, Lalit K. Mestha and Fred F. Hubble, III, now allowed appln. Ser. No. 09/535,007, filed Mar. 23, 2000, by Fred F. Hubble, III, and Joel A. Kubby, now U.S. Pat. No. 6,384,918 issued May 7, 2002 and U.S. Pat. No. 6,351,308 issued Feb. 26, 2002 from allowed appin. Ser. No. 09/448,987 filed Nov. 24, 1999 by Lalit K. Mestha.

There is provided an improvement in the color measurements of irregular surfaces, especially textiles, especially including, but not limited to, the testing and/or on-line control of color dying or other manufacturing operations for textiles. The disclosed method is especially suitable for improved yet low cost color measurements for any textiles which can change their apparent or observed color depending on the viewing or illumination angle of the area of the textile being tested. The disclosed improved color measurement system may thus be used with woven silk, polyester or other woven textiles with particular color measurement difficulties, but may also be used for color measurement of other textiles, such as carpeting and other non-woven textiles, and even threads or yarns of or for textiles.

Specifically, a desirable system for color measurements of textiles is provided that can be used easily, quickly, and uncritically in terms of the handling, positioning and orientation of the material to be tested, yet provide accurate and consistent color measurements, at relatively low cost.

Operating principles of the improved spectrophotometer color sensing architecture of disclosed embodiments herein and in the above-identified parent patent application, of which this is a CIP, have been found to provide an unexpectedly improved method of accurately measuring the colors in textiles, such as fine woven cloth, carpeting, etc., especially those with illumination or illumination reflectance angle sensitive surfaces. More accurate color measurements for these and other such unevenly light reflective surfaces can be provided by the much wider range of color target azimuthal and displacement insensitivity. Including, for example, greatly improved color measurement repeatability and reduced azimuthal variations on textured fabric samples, or fabric samples which are rotated between tests.

In some actual testing on textured fabric samples, color reflectance measurements were found repeatable with rotated fabric samples to less than 1 deltaE, using a spectrometer detector of the exemplary embodiment having a 0–45 degree illumination and detection architecture with displacement insensitive optics and six angularly disposed detectors averaging the reflected light.

The repeatability of the exemplary color measurement system output was high even for the testing of color threads. Hence the exemplary system may even be useful for knit and woven fabrics designs created from differently colored yarns. When specific colored threads are desired or required for a proposed design, the fabric designers could more accurately measure the actual thread colors in advance and be more able to accurately predict the fabric colors in advance of weaving the fabric. This type of improved workflow could reduce the production time for high quality outputs.

Also, the measured color signals of the yarn and/or fabric could be connected into a computer to appear on a display screen. This might especially help in designing fashions on a computer, by being able to import the measured colors of the textile samples. The color areas could also be moved or juxtaposed on the screen with available software. (As is well known, adjacent colors affect human color perception.)

The disclosed method of measuring color may provide cost effective improvements for various other textile/fashion retail markets, and/or graphic arts, as well as textile manufacturing operations. Other potential applications could be in carpet dyeing, coloring of fashion-ware accessories, such as knitwear & yarns, dyeing leather, color matching or control of plastic coatings, etc.

The disclosed method could be used on-line in textile manufacturing as part of direct feedback color control and correction systems, or off-line on textile samples for regular or random quality control testing. The disclosed low cost textile color measurement system can be used in numerous different color calibration or correction systems, and can be readily incorporated into the color calibration or control of various on-line color control or color processing systems.

An example of a particular long-standing commercial need is providing color matching solutions for fabric dye houses, especially for maintaining consistent colors between different "dye lots" or batches. Maintaining color consistency continues to challenge even the most modern of dye houses. The properties of the supplied substrates or dyes, and the ambient processing conditions, frequently keep slightly changing. Also, color dye blends are increasingly complex. Due to such varying factors, dyers face significant challenges in producing accurate and repeatable colors, and need a better color measurement system.

The control of metamerism, where samples which appear identical under one illuminant appear different under others, is another important factor in the dye and fabric industries. The exemplary system can rapidly measure the colors of the same test target area at different wavelengths and can produce and detect different reflectance spectra therefrom that can provide for accurate broad spectral reconstruction algorithms.

In particular, the disclosed system provides improved measurement accuracy for color test surfaces which may be variously or variably tilted, curved, non-planer or otherwise varying in angular orientation relative to the color measurement system apparatus, which, in the examples herein, is an improved spectrophotometer. That is particularly desirable for enhancement of the accuracy of a non-contact spectrophotometer which can measure the colors or color densities of test surfaces spaced from the spectrophotometer, or even moving surfaces of moving color objects, webs or materials, without requiring the test surface material to be constrained against a reference surface or against the spectrophotometer. This freedom of movement of the test material, both transversely to, and variably spaced from, a spectrophotometer, is very desirable in various color measurement applications.

Further, a color measurement system allowing angular or rotational freedom of movement of the test material or media can additionally very desirably allow the color test surface thereof to have variances in angular alignment relative to a spectrophotometer. The disclosed spectrophotometer embodiment and measurement system can desirably greatly reduce measurement and output signal errors from such variances in angular alignment. Including greatly reducing measurement variances from differences in media reflectivity from media azimuthal or rotational orientation differences, such as from thread or fiber orientation differences relative to the measurement device.

As will be further described, the improved angular and azimuthal insensitivity of the embodiment herein is fully compatible with, and is shown herein combinable with, various of the spectrophotometer features of the above-cross-referenced copending commonly owned U.S. applications, especially the displacement insensitivity system, as in U.S. appln. Ser. No. 09/535,007, filed Mar. 23, 2000, by the same Fred F. Hubble, III, and Joel A. Kubby, now U.S. Pat. No. 6,384,918 issued May 7, 2002. Also it is compatible with the optional utilization multiple different photo-sites detectors such as those of the above cross-referenced Application by Jagdish C. Tendon and Lingappa K. Mestha (Ser. Nos. 09/862,247 and 09/963,042) (which are also described herein, as an alternative embodiment). An earlier patent of background interest as to colorimetry and a specific color sensor structure for color measurement of the printed sheets output of a color printer is Xerox Corp. U.S. Pat. No. 5,748,221, issued May 5, 1998 to Vittoria Castelli, et al, filed Nov. 1, 1995.

In the specific exemplary spectrophotometer embodiment further described below, it may be seen that plural different color emission LEDs sequentially project their respective illuminations substantially in parallel, perpendicularly to the color test target surface, rather than at an angle thereto, so as to provide a substantially circular, rather than elliptical, commonly illuminated area of the test target. That is, with all the LEDs centrally located together, their illumination pattern on the test target may be formed from rays that hit the target at approximately 90 degrees, i.e., normal to the target. This will produce a circular or nearly circular irradiance pattern on a selected area of the target when the target surface is at 90 degrees thereto. The photosensors may be optically oriented at 45 degrees to the test target to receive the reflected light from the illuminated test target. As will be further explained herein, when the test target surface deviates from said 90 degrees, this circular LED irradiance pattern becomes only slightly elliptical, with little area change, and thus causes little variance in the target irradiance and, therefore, in the signals from the photosensors, hence providing improved spectrophotometer angular insensitivity.

An additional feature for improved spectrophotometer accuracy in the disclosed embodiment is to provide averaging of the outputs of plural photodetectors which are angularly viewing the target irradiance area from different positions around it, on opposing sides, so as to average any varying angular and/or azimuthal reflectivity of the target area, and thus further increase the insensitivity to changes in alignment with the target area.

Although not limited thereto, the exemplary embodiments described herein may be an integral part of an automatic on-line continuous color correction system. That is because such a spectrophotometer may be affordably provided and easily mounted in the material movement or operating paths of various color dying or printing processes for non-contact (spaced) color measurements without interfering with normal movement of the media. Examples of various such color control or "colorimetry" function systems are further described in the above cited co-pending applications and patents, and other art cited therein. This is in contrast to the high cost (and other unsuitability's for on-line use) of typical laboratory spectrophotometers.

As already stated in the subject parent application "it should be noted that color measurements, and/or the use of color measurements for various quality or consistency control functions, are also important for many other different technologies and applications, such as in the production of textiles, wallpaper, plastics, paint, inks, etc. Thus, the disclosed color detection system may have applications in various such other fields where these materials or objects are to be color tested."

By way of some examples of the construction or design of various other color spectrophotometer themselves, besides Xerox Corp. U.S. Pat. No. 5,748,221 above, and, the above cross-referenced U.S. appln. Ser. No. 09/535,007, filed Mar. 23, 2000 by Fred F. Hubble, III and Joel A. Kubby, now U.S. Pat. No. 6,384,918 issued May 7, 2002, there is noted HP U.S. Pat. No. 5,671,059, issued Sep. 23, 1997; and HP U.S. Pat. No. 5,272,518, issued Dec. 21, 1993; Accuracy Microsensor, Inc. U.S. Pat. Nos. 5838,451 and 5,137,364, both issued to Cornelius J. McCarthy on Nov. 17, 1998 and Aug. 11, 1992, respectively Color Savvy U.S. Pat. Nos. 6,147,761, 6,020,583, and 5,963,333; BYK-Gardner U.S. Pat. No. 5,844,680; and Colorimeter U.S. Pat. No. 6,157,454.

Of particular interest, as to the non-contact measuring of light reflectance absorption and/or transmission of test objects, including biological specimens, with a plurality of circularly arrayed angularly aimed LED's of different wavelengths is U.S. Pat. No. 3,910,701 issued Oct. 7, 1975 to G. W. Henderson, et al.

Some patents of interest relating to densitometers include U.S. Pat. Nos. 4,553,033; 4,989,985; and 5,078,497. Patents relating to providing uniform surface irradiance include U.S. Pat. No. 5,526,190.

As used in the examples herein, unless otherwise specifically indicated, the term "spectrophotometer" may broadly encompass a spectrophotometer, calorimeter, and densitometer. That is, the word "spectrophotometer" may be given a broad definition and coverage herein. The definition or use of such above technical terms may also vary or differ among various scientists and engineers.

The following is an attempt to provide some simplified clarifications relating and distinguishing the respective terms "spectrophotometer," "calorimeter," and "densitometer," and narrower definitions that may be used in some technology contexts, but not as claim limitations.

A typical "spectrophotometer" measures the reflectance of an illuminated object of interest over many light wavelengths, to substantially cover the humanly visible color spectra or wavelength range. A typical spectrophotometer gives color information in terms of measured reflectances or transmittances of light, at the different wavelengths of light, from the test surface. (This is to measure more closely to what the human eye would see as a combined image of a broad white light spectra image reflectance, but a spectrophotometer desirably provides distinct electrical signals corresponding to the different levels of reflected light from the respective different illumination wavelength ranges or channels.)

A "colorimeter" normally has three illumination channels, red, green and blue. That is, generally, a "colorimeter" provides its three (red, green and blue, or "RGB") values as read by a light sensor or detector receiving reflected light from a color test surface sequentially illuminated with red, green and blue illuminators, such as three different color LEDs or three lamps with three different color filters. It may thus be considered a limited special case of a "spectrophotometer," in that it provides output color information in the trichromatic quantity known as RGB.

Trichromatic quantities may be used for representing color in three coordinate space through some type of transformation. Other RGB conversions to "device independent color space" (i.e., RGB converted to conventional L*a*b*) typically use a color conversion transformation equation, or a "lookup table" system, in a known manner. (Examples are provided in references cited herein, and elsewhere.)

A "densitometer" typically has only a single channel, and simply measures the amplitude of light reflectivity from the test surface, such as a developed toner test patch on a photoreceptor, at a selected angle over a range of wavelengths, which may be wide or narrow. A single illumination source, such as an IR LED, a visible LED, or an incandescent lamp may be used. The output of the densitometer detector is programmed to give the optical density of the sample. A densitometer of this type is basically "color blind." For example, a cyan test patch and magenta test patch could have the same optical densities as seen by the densitometer, but, of course, exhibit different colors.

A multiple LED reflectance spectrophotometer, as in the specific example of the embodiment herein, may be considered to belong to a special case of spectrophotometers which normally illuminate the target with narrow band or monochromatic light. Others, with wide band illumination sources, can be flashed Xenon lamp spectrophotometers, or incandescent lamp spectrophotometers. A spectrophotometer is normally programmed to give more detailed, and broader spectra, reflectance values by using more than 3 channel measurements (e.g., 4 or more channel measurements), with conversion algorithms. That is in contrast to normal three channel calorimeters, which cannot give accurate, human eye related, reflectance spectra measurements, because they have insufficient measurements for that (only three measurements).

The preferred implementations of the systems and features disclosed herein may vary depending on the situation. Also, various of the disclosed features or components may be alternatively used for such functions as gray scale balancing, turning on more than one illumination source at once.

This patent application is not related to or limited to any particular one of the various possible (see, e.g., various of the cited references) algorithms or mathematical techniques for processing the electronic signals from the spectrophotometer to generate or update color correction tables, tone reproduction curves, or other color controls, and hence they need not be further discussed herein.

Various possible color correction systems can employ the output signals of spectrophotometers, using various sophisticated feedback, correction and calibration systems, which need not be discussed in any further detail here, since the general concepts and many specific embodiments are disclosed in many other patents (including those cited herein) and publications.

A specific feature of the specific embodiment disclosed herein is to provide a method for more accurately measuring the color of irregular surface materials, including textiles which may provide dissimilar color measurements from different viewing angles, comprising illuminating a sample area of said irregular surface material approximately perpendicularly thereto and measuring the color reflected from said illuminated sample area of said irregular surface material at a substantial angle to said illuminated sample area of said irregular surface material with a plurality of separate photodetectors spaced arrayed around said illuminated sample area of said irregular surface material to receive reflected said illumination from said illuminated sample area of said irregular surface material from substantially opposing directions and at a substantial angle to said illuminated sample area of said irregular surface material.

Further specific features disclosed herein, individually or in combination, include those wherein said substantial angle is approximately 45 degrees, and/or wherein said illuminating of said sample area of said irregular surface material comprises a plurality of rapid sequential illuminations of different spectral illuminations, and wherein said irregular surface material is textile material moving relative to said plurality of separate photodetectors, and/or wherein said plurality of separate photodetectors are relatively evenly circularly positioned around said illuminated sample area of said irregular surface material, and/or wherein said plurality of separate photodetectors each comprise plural photosites with plural different spectral sensitivities, and/or wherein said irregular surface material is textile material and said textile material is carpeting, and/or wherein said irregular surface material is textile material and said textile material is woven cloth, and/or a method comprising illuminating an area of an irregular surface material substantially perpendicularly thereto and measuring the color reflected from said illuminated area of said irregular surface material at a suitable angle to said illuminated sample area of said irregular surface material with a plurality of separate photodetectors spaced arrayed around said illuminated area of said irregular surface material to receive reflected said illumination from said illuminated area of said irregular surface material from opposing directions and at a suitable angle to said illuminated area of said irregular surface material, and/or a method for accurately determining the color of a material which may provide dissimilar color measurements from different viewing angles, comprising illuminating a sample area of said surface material and measuring the color reflected from said illuminated material at an angle to said illuminated material with photodetectors situated around said illuminated material to receive reflected said illumination from said illuminated material from opposing directions and at an angle to said illuminated sample area of said material.

The disclosed system may be connected, operated and controlled by appropriate operation of conventional control systems. It is well known and preferable to program and execute various control functions and logic with software instructions for conventional or general purpose microprocessors, as taught by numerous prior patents and commercial products. Such programming or software may of course vary depending on the particular functions, software type, and microprocessor or other computer system utilized, but will be available to, or readily programmable without undue experimentation from functional descriptions, such as those provided herein, and/or prior knowledge of functions which are conventional, together with general knowledge in the software and computer arts. Alternatively, the disclosed control system or method may be implemented partially or fully in hardware, using standard logic circuits or single chip VLSI designs.

As to specific components of the subject apparatus, or alternatives therefor, it will be appreciated that, as is normally the case, some such components are known per se in other apparatus or applications which may be additionally or alternatively used herein, including those from art cited herein. All references cited or cross-referenced in this specification, including the parent application of which this is a CIP, and their references, are incorporated by reference herein where appropriate for appropriate teachings of additional or alternative details, features, and/or technical background. What is well known to those skilled in the art need not be described here.

Various of the above-mentioned and further features and advantages will be more apparent from the specific exemplary apparatus and its operation described in the examples below. The following is a description of a specific embodiment, including the drawing figures (approximately to scale, except for schematics) wherein:

FIG. 4 is a schematic and greatly enlarged partial plan view of an optional multiple photosites photodetector which may be utilized in lieu of a conventional single photosite detector in the exemplary spectrophotometer of FIGS. 1 and 2, comprising an exemplary silicon color image sensor array chip (normally part of a commercially available document imaging bar) with three rows of photosensor sites transmissively filtered red, green and blue, respectively, in a known manner, for respectively sensing spectra in those three separate colors, and also showing an (optional) fourth row of photosensor sites without filters for white light sensing, with the area defined by the circle illustrated thereon representing an exemplary area of this sensor array chip being illuminated by LED source light reflected by the test target;

We will now refer in further detail to the specific exemplary embodiment of a color sensing system 10 with a spectrophotometer embodiment 12 as shown in the above-described Figures, for testing color test areas. The azmuthal insensitivity features of this spectrophotometer 12 embodiment are shown and described herein combined with displacement insensitivity features thereof which are also the subject of said above cross-referenced copending commonly owned U.S. appln. Ser. No. 09/535,007 filed Mar. 23, 2000, by the same Fred F. Hubble, III and Joel A. Kubby, now U.S. Pat. No. 6,384,918 issued May 7, 2002. The principles of those displacement insensitivity features will be re-explained below in relation with the different spectrophotometer 12 here.

As noted in said copending application, it is desirable to reduce variations in the spectrophotometer output with variations in the target displacement distance. However, achieving improvement in either or both displacement insensitivity and azmuthal insensitivity is complicated when it is desired to measure reflectivity from a test area illuminated at 45 degrees relative thereto.

Although not essential, it is normally desirable to be compatible with industry standards set forth by the CIE, ASTM, and others, in which the test patch illumination for color measurement should be at 45 degrees to the surface of the media on which the color test patch is printed. Also for these standards the color test patch measurement should be performed using flux diffusely scattered from the (so-illuminated) test patch at 90 degrees (perpendicular) to that color test patch surface. A significant challenge in implementing a spectrophotometer to that standard is the repeatable collection of the reflected flux, as the amount of flux collected is proportional to the solid angle subtended by the entrance pupil of the flux collection optics. However, it has been found that these standards can be met by the different architecture spectrophotometer 12 here, which instead illuminates the test surface at 90 degrees, and makes the color measurements of reflected light at 45 degrees to that illuminated test surface.

As noted, prior spectrophotometers, calorimeters, and densitometers required that the measured target be held in a fixed predetermined position during measurement, typically accomplished by physically pressing the target material flat against a reference surface attached or held closely adjacent to the device's sense head. That limits or inhibits many desired color measurement opportunities, and is not required by the disclosed system.

As the displacement between a color sensor and the sensed media varies, the amount of flux collected will vary in a corresponding manner according to the following equation:

$$E\ \Omega = A|r^2$$

Where
    $\Omega$=the solid angle subtended by the projection optics,
    A=the area of the projection optics entrance pupil, and
    r=the displacement between the test patch and the entrance optic.

As displacement changes, the amount of flux collected varies, and this variation will be indistinguishable at the electrical signal output from variations in the density of the patch, which will lead to errors in the measured density if not compensated for.

One solution would be to mechanically constrain the media in the measurement nip by means of additional apparatus in the paper path. However, as noted above, this is highly undesirable because of the increased cost associated with additional components, and the probable increase in jams due to the constriction in the paper path.

The solution disclosed here is to instead provide a novel spectrophotometer 12 which is relatively insensitive to the relative displacement between the spectrophotometer and the color target media it is measuring. This is far more desirable, as it minimizes interference with the media, allows architectural versatility in the placement of the sensor, and, if done correctly, need add only a small increment in sensor UMC. There is provided here a spectrophotometer 12 whose output is relatively insensitive to the displacement from the surface of the media under interrogation, yet which is compact and relatively inexpensive.

Figure 2:
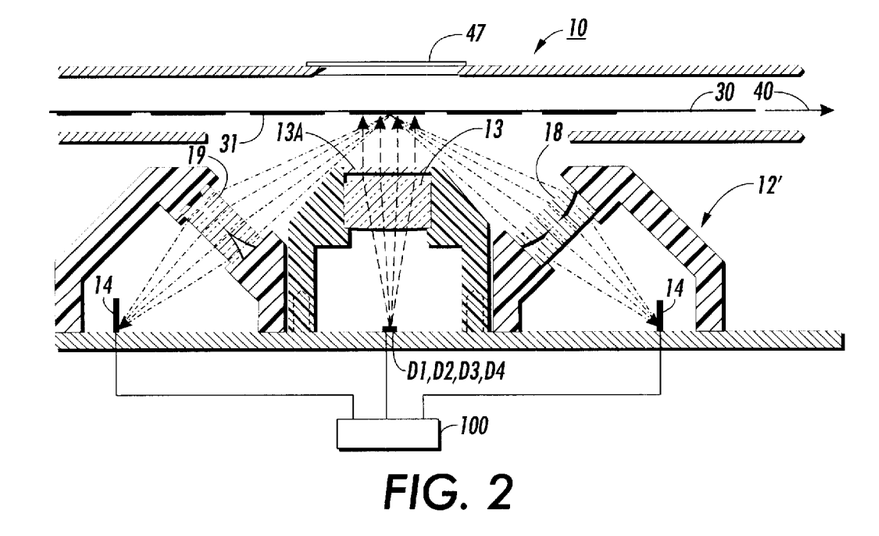
FIG. 2 is a cross-sectional view taken along the line 2—2 of the spectrophotometer of FIG. 1 shown measuring the color of a test patch of an irregular surface color textile web segment, moving in this example in an exemplary path relative to the spectrophotometer.

As otherwise described herein, in the spectrophotometer 12 of FIG. 2 flux from a selected sequential light source such as D1, D2, D3, or D4 (the particular light source being illuminated at that time) is shown being collimated by a common condensing lens 13 (with an IR filter 13A) and applied to a test patch 31 on the test media 30, here the surface of an uneven and relatively unconstrained (in position or angle) textile segment. An inverted image of the illuminated area is formed at the plane of the detectors 14 in FIG. 2 by projection (target) optics 18 and 19, which overfills the detection areas of the detectors. By selecting the magnification of that target optic 18 and 19 to be substantially 1:1, it has been discovered that, to the first order, and for object to sensor displacement variations that are small relative to the total conjugate, the energy density in the image detected by the detector will be invariant to the spacing between the media and the sense head, as will be explained. Light energy reflected from the test patch 31 which is collected by the lenses 18 and 19 is proportional to the solid angle subtended by that projection lens. Mathematically, as the media to optic displacement, r (not shown), varies, the total energy in the image varies by the solid angle, which is proportional to $r^{(-2)}$. Variation in the media to sensor spacing also affects the image size in a corresponding and compensating manner. For 1:1 imaging optics, image magnification varies as the inverse of the object displacement, $r^{(-1)}$, which produces a change in the image area proportional to $r^{(-2)}$. Thus the image energy density, i.e. energy per unit area, becomes to the first order invariant with displacement. Since the detector samples a fixed area within the image, its output is thereby also made invariant with spacing.

To express this another way, with a collection lens for the photosensitive detector having a one to one magnification, a fixed exposed area of the photosensitive detector will effectively get almost the same number of microwatts of energy per square millimeter from an illuminated target area even if the target area varies in distance therefrom by as much as plus or minus three millimeters, or more. Or, in this example, allowing a color printer test sheet displacement or freedom of movement in the printer paper path of at least plus or minus three millimeters relative to the spectrophotometer without affecting the ability of the system to read the test colors accurately.

To provide a further explanation mathematically, assume:

An image and object conjugates of 2f, that the system magnification is 1:1;

For small variations in media displacement, "d," image area $\sim(2f+d)^{-2}$;

Target irradiance is maintained constant by the collimating action of the condenser lens;

Total energy in the image $\sim(2F+d)^{-2}$;

Image energy density (image energy÷image area) is thus made independent of "d" for a magnification of 1:1; and A 1:1 magnification is thus the best operating point for the detector optics.

While 1:1 is preferred, it is projected that a range of 0.9:1 to 1.1:1, or approximately 1:1, may be usable in some situations with degraded accuracy. By "approximately" 1:1 magnification of the lens 13 (the lens for the fixed area of the light receptive portion of the photosensor D12), it is meant here that first order accuracy in the light intensity on the photosensor, and thus first order accuracy in its output signal, can also be obtained for a limited range above or below 1:1. That range would still allow a variation in target spacing from the spectrophotometer 12 of + or − approximately 2.5–3 mm within said first order color reflectance measurement accuracy, thus allowing approximately 6 mm or more of normal spacing between the defining or confining opposing baffles of the paper path at that point.

Thus, this lens system for transmitting the illumination from the test patch to the photodetector sensor provides effective displacement insensitivity in the electrical signals provided by that photodetector sensor for variations in displacement between the test area and the spectrophotometer of up to at least 6 millimeters. That allows a corresponding amount of lateral displacement freedom of movement tolerance (and opposing baffles spacing), and/or test area surface curl or cockle tolerance. That is, the test material does not have to be pressed against, or closely confined against, a reference surface or the spectrophotometer.

An exemplary suitable focal length of the photosensor lens systems 18 and 19 can be about 11 mm. That appears to be a good tradeoff point between the amount of light energy desirably collected at the sensor and the achievement of displacement insensitivity in a reasonably sized spectrophotometer package. Different focal length lenses can be used, but the overall conjugate (the distance between the test patch and its image) would change correspondingly to maintain the same displacement insensitive behavior.

The concept is implementable with various technologies or conventional components, including hybrid chip on-board, which is preferred, especially to provide a single on-board chip or board for a plural LED spectrophotometer as shown. In that architecture, an appropriate selection of LED die with different wavelengths covering the visible spectrum may be mounted to a PWB. As will be further described with reference to the circuit example of FIG. 3, each LED may be lit in sequence.

Figure 1:
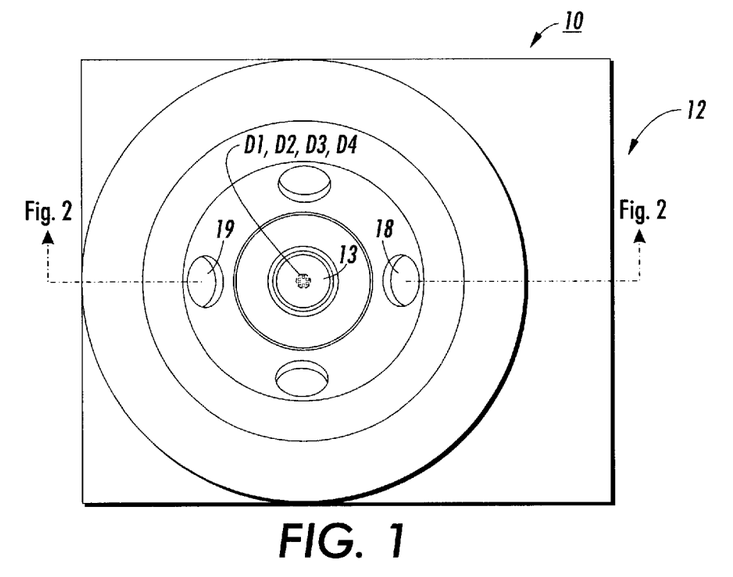
FIG. 1 is a top view of one example or embodiment of a spectrophotometer which may be used with one example of the subject method.

The flux from each LED is collimated and centrally directed to be applied to the same test patch area under the center of the spectrophotometer 12. That position is on the optical axis of the lens 13, which lens 13 is located in the center of the ring or circle of LEDs, as shown in FIG. 1. By recording the successive detector outputs when a test patch is successively illuminated by each individual LED, the reflectance of the test patch as a function of different wavelengths can be determined. With a sufficient number of plural different LED output wavelengths that reflectance of the same test patch as a function of different wavelengths can be extrapolated or interpolated over the entire visible spectra.

An exemplary test measurement time for the spectrophotometer 12 may be only about 2 to 5 milliseconds, or less. With that speed, measurements can be made in real time for moving test media passing across and through the spectrophotometer 12 sensing area, to avoid interference with normal media production and output.

Now, with specific reference to the subject azimuthal insensitivity features, in the prior spectrophotometer embodiment configurations shown in the earlier above cross-referenced applications the photosensor (detector) is on the central or zero axis of the spectrophotometer to receive reflected light perpendicularly (at 90 degrees) from the illuminated area of the test target, and that illumination is by plural LEDs spaced around that central axis aimed at 45 degrees to the test target.

In contrast, in the present spectrophotometer 12 configuration of FIGS. 1 and 2, the plural different color emission LEDs are together in one central unit, board, or chip, projecting light in parallel along the central or optical axis of the spectrophotometer at 90 degrees to the test target (e.g., the color patch on the moving sheet of paper), so as to provide a substantially circular, rather than elliptical, illuminated area of the test target. The photo-sensors are optically oriented at 45 degrees to the test target to receive the reflected light from the test target. This change from a 45–0 degree system to a 0–45 degree system has been discovered to substantially reduce measurement errors from test target misalignment relative to the spectrophotometer. That is, accommodating considerable variation in the angle of the test surface relative to the central axis of the spectrophotometer, which can vary for various reasons.

By having all the LEDs centrally located, their illumination pattern on the test target may be formed from rays that hit the target at approximately 90 degrees, i.e., normal to the target. This will produce a circular or nearly circular irradiance pattern on a selected area of the target when the target surface is at 90 degrees thereto, as intended. When the target surface deviates from 90 degrees, by factors such as curl or buckle, sensor mounting misalignment, or other effects, this LED irradiance pattern becomes only slightly elliptical, with an area larger than the circle by the factor 1/cos(theta), where theta is the deviation from 90 degrees.

For example, if the incident angle were to become 93 degrees, then theta would be 3 degrees, the area of the irradiance would be A/cos(3)=1.001A, where A was the selected illuminated area. The flux reflected from the target and collected by the detectors is proportional to the irradiance. Since it may be seen that the is irradiance (energy per unit area) varies very little for this 3 degrees example, only by 0.001, the signals from the detectors likewise vary very little.

It may be seen in FIG. 2 that the flux from each of the LEDs is collimated by the same condensing lens 13 and applied to the test patch surface at a normal incident angle of 90 degrees or perpendicular thereto to form the illuminated area. An inverted image of that illuminated area is formed in the focal plane of each projection lens 18 and 19 (which are providing the desired 1:1 imaging optics) where that inverted image overfills its respective optical detector.

Other advantages of the above-described configuration of centralized LEDs include: being able to use a single condenser lens for all of the LEDs, instead of a separate lens for each; easier measurement of all the LED temperatures and/or outputs accurately with one integrated circuit located nearby; and a less expensive to implement architecture.

Figure 3:
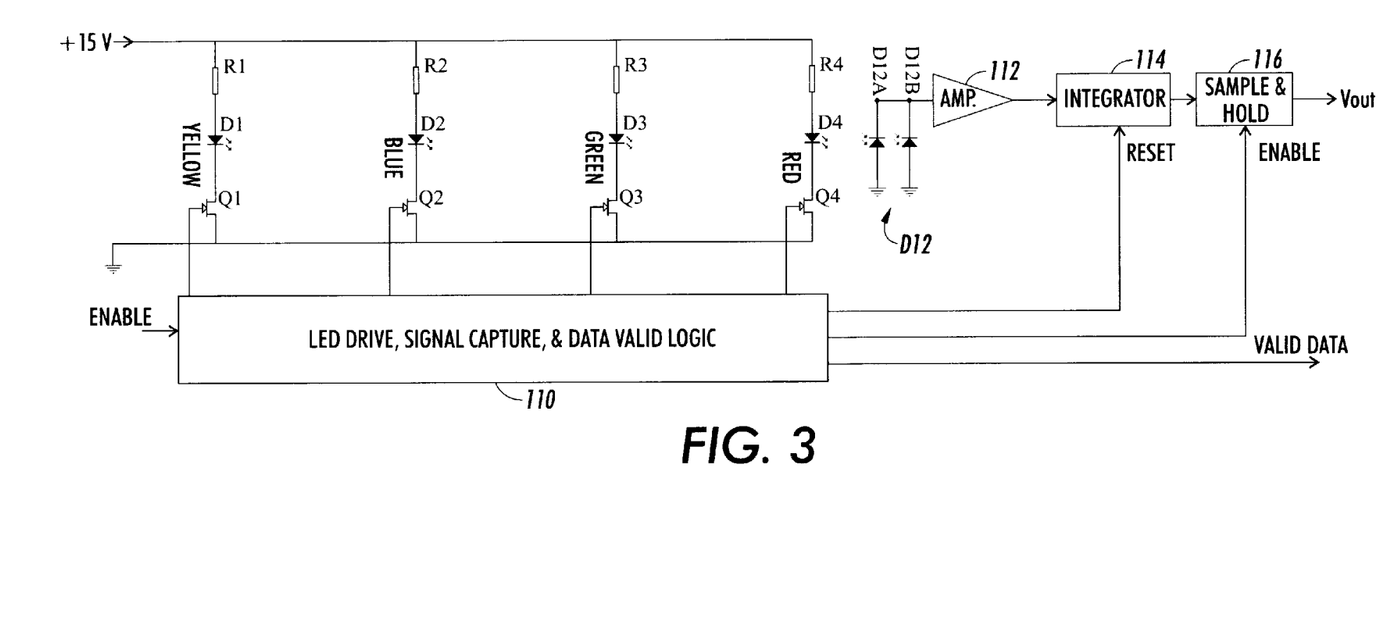
FIG. 3 schematically shows one example of circuitry with which the exemplary spectrophotometer of FIGS. 1 and 2 may be operated.

An important disclosed feature in improving spectrophotometer accuracy for variable target angles or variable relative rotation of targets such as textiles with different apparent reflectivities from different angles, is to provide the averaging of the outputs of plural photodetectors which are viewing the irradiance area from different positions around it, such as is shown in FIG. 1, so as to average the varying azimuthal reflectivity of the target area, and thus also to further increase the insensitivity to angular misalignment with the target area. In the above example of a 3 degree tilted target surface, a detector on one side of the spectrophotometer central axis will view the illuminated target area at 45 minus 3 degrees, while a detector on the opposite side of the spectrophotometer will view the same illuminated area at 45 plus 3 degrees (or vice versa) but their output signals may be averaged to cancel out that effect, as by summing their outputs, as shown in FIG. 3.

Although an example of four equally spaced photosensor 14 sites are provided in the embodiment of FIGS. 1 and 2, circularly spaced at 90 degrees around the LEDs central axis, it will be appreciated that, for example, six photosensors spaced at 60 degrees apart could be employed. It is also believed that a spectrophotometer configuration of only three photosensors spaced around the central axis by 120 degrees from one another (and thus needing only 4 lenses in total for the spectrophotometer) would also be sufficient to reduce measurement errors from such an azimuthal variation to less than one percent.

Figure 4:
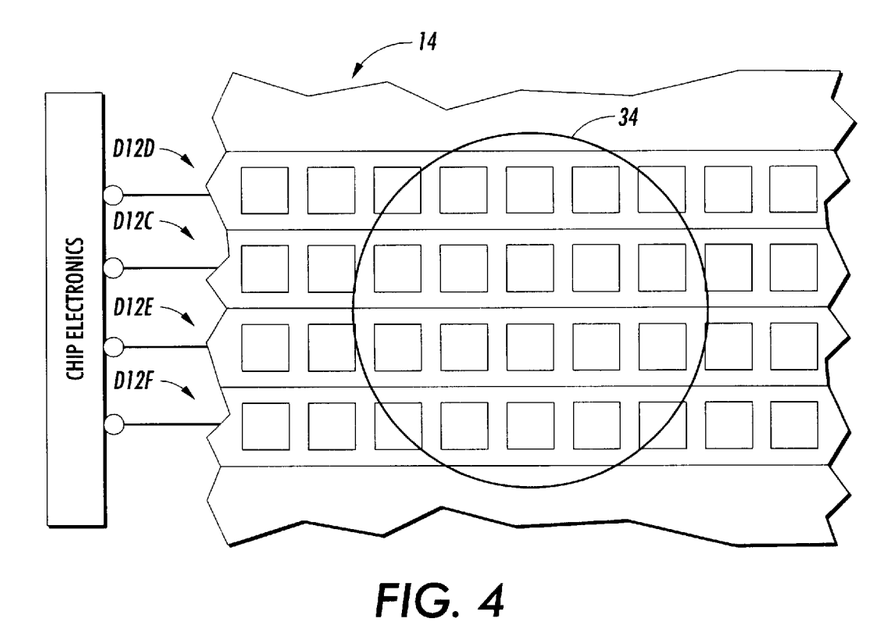

As shown in FIG. 4, as an optional alternative to conventional single cell photodetectors, each of said plural spaced photodetectors may be a low cost single chip, multi-pixel, plural color, photo-detector, such as those described in detail below and in the cross-referenced copending U.S. appln. Ser. No. 09/862,247, filed May 22, 2001, by Jagdish C. Tandon and Lingappa K. Mestha. The spectrophotometer may also have a reduced numbers of LEDs. However, this is not essential. Even with only three conventional individual single cell photosensors, the disclosed spectrophotometer configuration can reduce the number of LEDs from, e.g., 10, 12 or even 24 LEDs down to only eight LEDs for full color measurements. However, as will be described, by optionally using said plural color multiple photo-site detectors, as few as only three or four different LEDs may be employed and provide increased measurement speed and/or spectral coverage.

This optional additional feature disclosed herein is the particular subject of the above cross-referenced copending and commonly owned U.S. appln. Ser. No. 09/862,247, filed May 22, 2001, by Jagdish C. Tandon and Lingappa K. Mestha. It allows the spectrophotometer 12 embodiment to have a reduced total number of LEDs (e.g., only three or four) of appropriate different color spectral outputs to sequentially illuminate the exemplary color test targets. Furthermore, in this spectrophotometer 12 the reflected illumination level is desirably not detected by a single photocell sensor or individual photocells. Instead, it may be simultaneously detected by multiple spectral response photo-sites of a low cost color image sensor array chip 14, as in the example of FIG. 4, having rows of closely adjacent plural color sensors (photo-sites D12F, D12E, D12C and D12D) with respective plural different integral color filtering (none, blue, green and red) providing plural different spectral sensitivities, and plural parallel output signals, rather than a single output signal from an individual photosensor, from the LED illumination reflected from the test target area. The respective different color LEDs D1, D2, D3 and D4 may be switched on in a predetermined sequence (as in FIG. 3, or otherwise) to provide plural specific different spectral measurements within the visible wavelengths, as illustrated in FIGS. 5–10. Also, it is preferable that one LED provide white illumination. This provides a fast and low cost general color sensing solution.

If desired, those spectral measurements of an area of a test target may be converted to provide a true broad reflectance spectra, through known or other reconstruction and extrapolation algorithms. Both the number and spectra of the LED illuminators and the photosensor sites may be varied, where appropriate, and are not necessarily limited to the specific numbers and specific wavelengths of this specific embodiment example.

It will be noted especially with respect to these descriptions that the terms "photosensor sites," "photo-sites," "photosensitive cells," "cells," "detectors" (D) or "sensors" are variously used interchangeably in descriptions herein, as in the art, unless otherwise indicated.

Commercial mass-produced low cost document imaging bars are typically formed by edge butting together a plurality of individual imaging chips, each having multiple tiny and closely spaced photo-sites, as schematically shown in the FIG. 4 enlarged partial view example of such chip 14. Typically, each such chip 14 has three rows of such photo-sites (D12D, D12C and D12E here) manufactured with integral filters for red, green and blue, respectively. Also, each chip 14 typically has integrated electronics; sample and hold circuitry, etc. The spectrophotometer 12 desirably utilizes at least one (or more, depending on the spectrophotometer design) of these low cost individual imaging chips 14. It is suggested here that chips 14 may be obtained from a manufacturer thereof before they would otherwise be fastened together into a document imaging bar.

Figure 5:
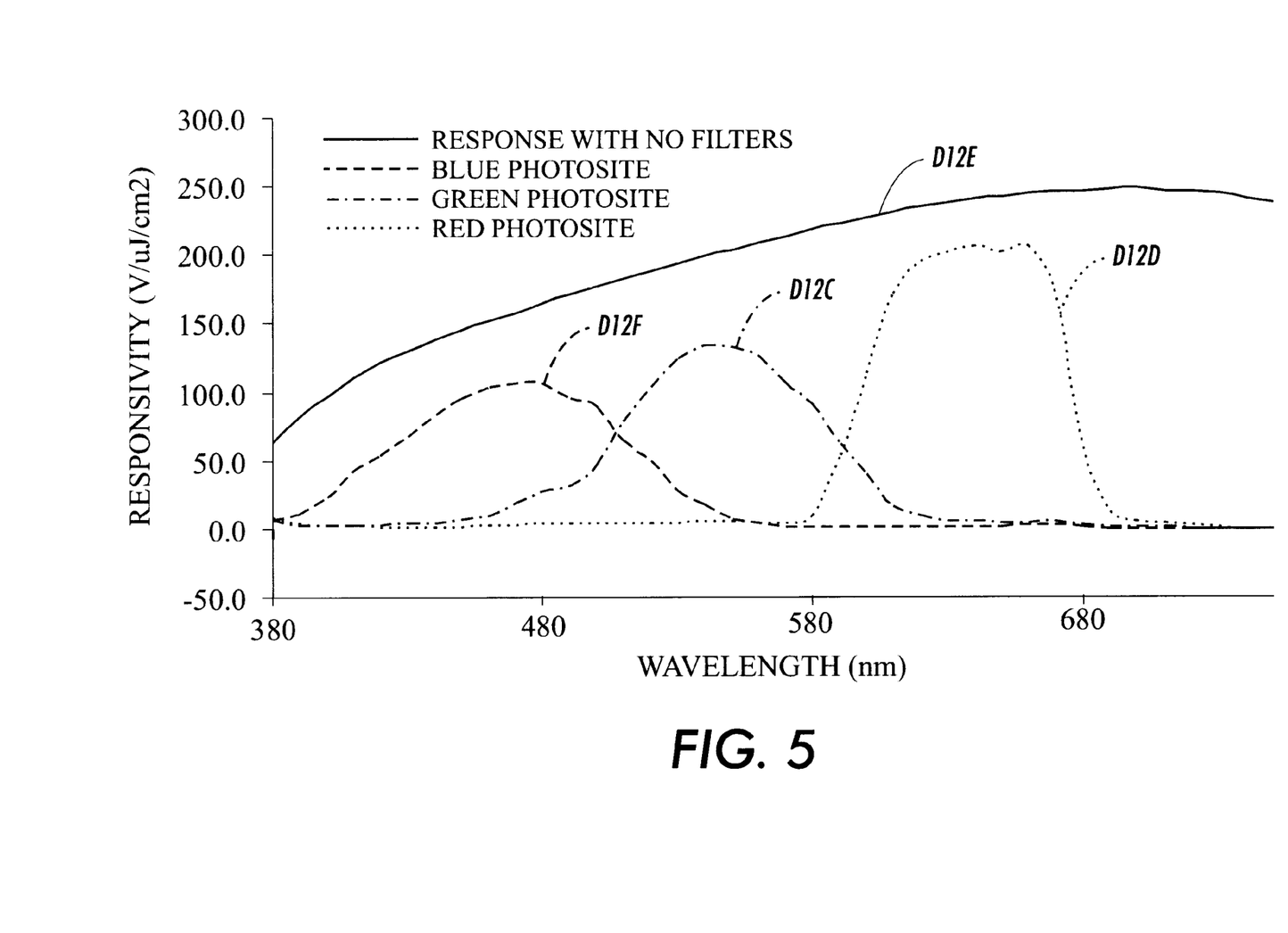
FIG. 5 shows in a plot of wavelength (horizontal) versus relative response (vertical) the four exemplary spectral responses of the exemplary image sensor array chip of FIG. 4, respectively for its unfiltered sensors (the solid line), blue filtered sensors (the dashed line), green filtered sensors (the dot-dashed line) and red filtered sensors (the dotted line)

As one example of such a known document imaging bar, it may be made from twenty of such individual imaging chips 14, with each chip 14 being 16 mm long. Each such chip can read 400×660 pixels, provided by 248 photosensitive cells, with a 63.5 micro-meter pitch between cells. The cells are in three parallel rows, with filters for red, green and blue in the respective rows, as shown in the example of FIG. 5. These chips are made with integral electrical leads and connecting electronics already provided to all of these 248 photo-sites.

If desired, and as also illustrated in the FIG. 4 example, another such row of photo-sites, D12F, may be added to these chips, for white light (broad spectrum) sensing, by a relatively simple manufacturing modification. That is, by simply adding one more such parallel row of cells in the same silicon semiconductor manufacturing steps (or otherwise) to provide another row of otherwise identical or similar photo-sites, but having no color filtering layer formed over the cells. Alternatively, a different filter may be superimposed on the photo-sites of that added fourth row. Alternatively, the chip 14 may be made with the same existing three rows of cells, but with every fourth cell in each row made without any filter. Or, every fourth cell in each row may be made a different filter. Some aperturing (exposed area reduction, such as by partial masking) may also be provided if desired for the unfiltered cells.

The cost of a suitable such image sensor chip, as is, or modified as described, may be lower than a non-commercial photosensor. It can also provide a much higher level of circuit integration. Thus, a much more cost-effective spectrophotometer can be made therefrom than from individual photosensors, and yet a number of parallel sensing outputs can be provided from each. As indicated above, the exemplary color image sensor chip 14 may differ somewhat from a conventional document color image sensor array or bar in that some of the photo-sites (D12F) on the color image sensor array may be left uncovered, without any color filter layers. By doing so, a fourth, broadband, spectral measurement is enabled from those unfiltered photo-sites along with the three different spectral measurements that the chip normally provides from its three differently colored filter covered photo-sites D12E, D12C and D12D. As noted, while commercially available color image sensor array chips typically have three rows of photo-sites that are coated with 3 different color filter layers; red, green and blue, thus providing a three-color spectra measurement capability, these same sensor array chips can be modified at low cost by simple modifications to provide an additional fourth spectral measurement capability. That is, modified so that some of the photo-sites are not color filtered. A broad spectrum illumination source, such as a white light LED, may be used therewith in a spectrophotometer configuration, as further described herein.

As shown herein, a spectrophotometer 12 with a suitable combination of a relatively small number of plural LEDs plus plural simultaneously exposed photo-sites, with an appropriate LED switching sequence to turn the LEDs on and off, can rapidly provide a large number of test target color measurements. As the number of measurements is so increased, the color measurement capability also becomes more accurate.

Depending on the particular color correction or calibration system needs, different numbers of LEDs can be used. However, it has been found that only a few LEDs having spectral output covering the sensitivity ranges of only two or more different types of photo-sites, plus a white LED or other light source, can provide a low total components count, and thus a lower cost, spectrophotometer, yet provide a relatively large number of spectra measurements.

This can be further understood by reference to the exemplary spectral curves shown in FIGS. 5–10 and their above FIG. descriptions. In FIGS. 5–10 the respective curves corresponding to exemplary LEDs have been labeled with the same reference numbers of the exemplary LEDs, D1, D2, D4 or D5.

Figure 6:
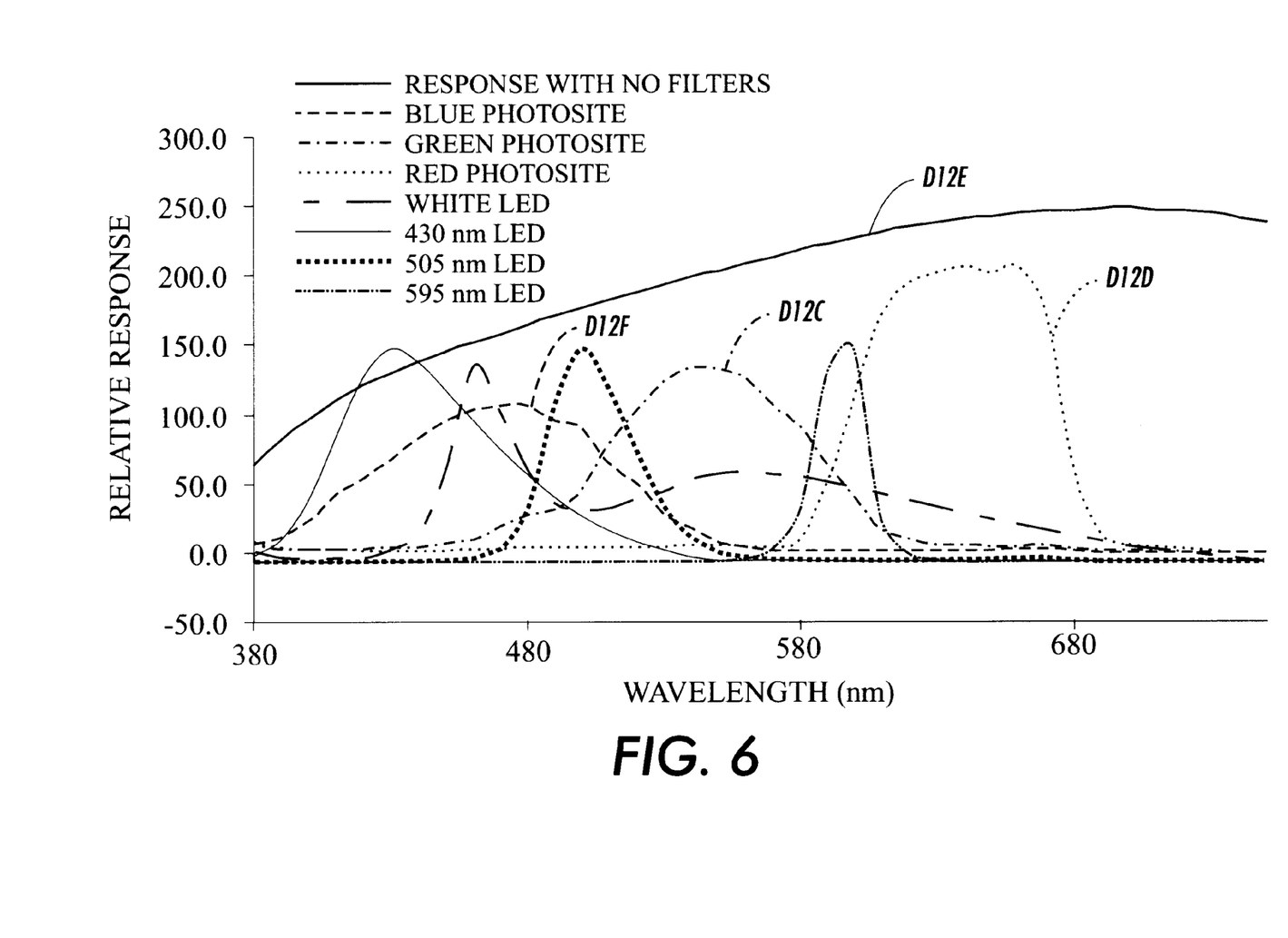
FIG. 6 is similar to FIG. 5 but shows superimposed on the curves of FIG. 5 the spectral outputs of four different exemplary LED illumination sources which may be integral to the exemplary spectrophotometer of FIGS. 1 and 2. (as described and shown in the table below), namely a white LED (the dash-long-dash line), a 430 nm LED (the thin line), and 505 nm LED (the line of squares), and a 595 nm LED (the dash-dot-dot dash line)
Figure 7:
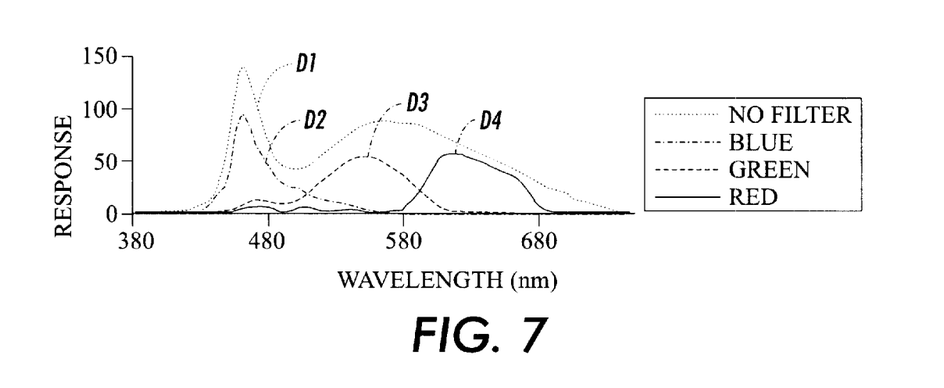
FIGS. 7, 8, 9 and 10 respectively sequentially show the combined response of all four different types of photo-sites of the photosensor chip of FIG. 4 as sequentially exposed to illumination from only one of the four different LEDs of FIG. 6, namely, in FIG. 7 the white LED, in FIG. 8 the 430 nm LED, in FIG. 9 the 505 nm LED, and in FIG. 10 the 595 nm LED.
Figure 8:
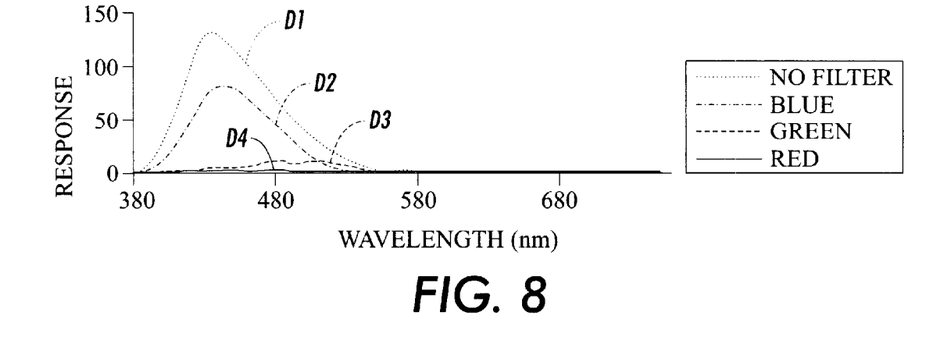
Figure 9:
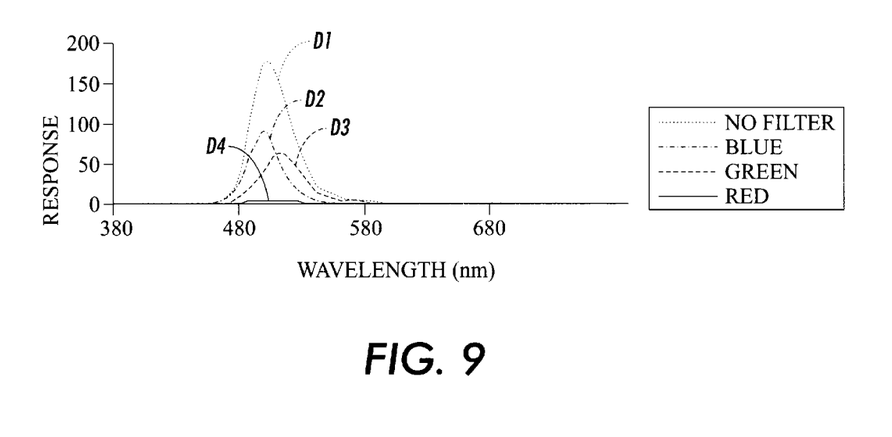
Figure 10:
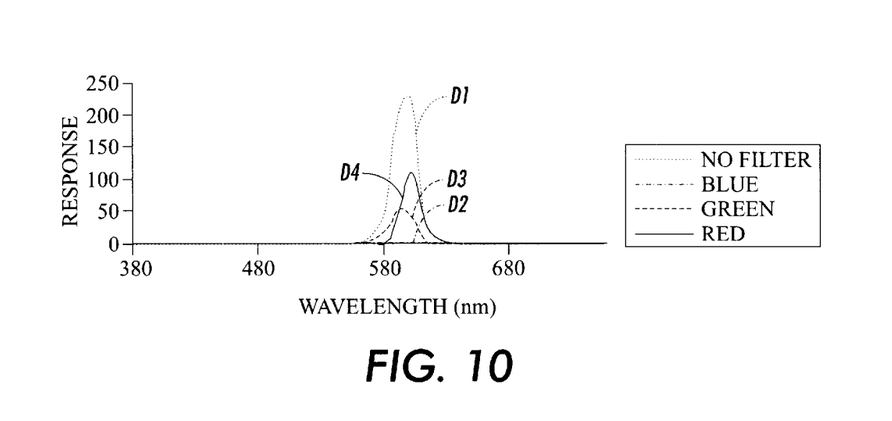

As noted, FIG. 4 is a schematic and greatly enlarged portion of a exemplary color image sensor array chip 14 which may be utilized in the exemplary spectrophotometer. Show in FIG. 6 is an exemplary illuminated area 34 thereof. This area 34 is illuminated by LED illumination through lens 13. That illumination is reflected from the test target area through the lens systems 18 and 19 to simultaneously illuminate multiple photo-sites in the three or four rows of each sensor chip 14. Those simultaneously illuminated photo-sites include the red, green, and blue photo-sites D12D, D12C and D12E, and also the unfiltered photo-sites D12F if they are provided on the chip 14.

The Table below further shows the number of spectral measurements that can be made with examples of combinations of different numbers of specific LEDs and an image sensor chip 14 with different photo-site filters:

| LEDs | | Number of Spectral Measurements | |
|---|---|---|---|
| | | With 3 Color (R,G,B filters) | With 4 Color (R,G,B filters + no filter) |
| Types | Number | Image Sensor | Image Sensor |
| White | 1 | 3 | 4 |
| White, +595 nm or 505 nm | 2 | 5–6 | 7–8 |
| White, 595 nm, 505 nm | 3 | 7–9 | 10–12 |
| White, 595 nm, 505 nm, 430 nm | 4 | 8–12 | 12–16 |

It may be seen from the last example of this Table that with a 4-color image sensor chip 14 (with unfiltered photo-sites in addition to red, green and blue filter photo-sites), that 4, 3, 3 and 2 (12 total) sets of spectral measurements can be obtained by detecting a color test target 31 illumination by only four LEDs (white, 595 nm peak, 505 nm peak and 430 nm peak). Thus, one can see that 12 spectral combinations can be measured using a spectrophotometer having only four LEDs and a single, low cost, multipixel (multiple photo-sites) image sensor array (chip) 14.

Integration times used with various rows of the image sensor array chip 14 can be independently controlled to match the LED power levels to get suitable output signals from the sensor array.

As discussed, some of the photo-sites in one or more of these rows are desirably left uncovered (with no color filters)

to get four spectral outputs from an otherwise conventional 3 row image sensor array. In general, the photo-sites that are not covered with color filters will provide a much larger output signal than those that are covered with filters. To compensate, part of the sensing area of these uncovered (unfiltered) photo-sites can be optionally coated in manufacturing with an opaque material or multiple layers of all three color filter layers to reduce their light sensitivity.

Any or all of the outputs of the sensor chip 14 may, of course, be calibrated/reconstructed to provide true reflectance values. For example, as in the commonly owned U.S. appln. Ser. No. 09/562,072 filed May 1, 2000 by Lingappa K. Mestha, et al., now U.S. Pat. No. 6,449,045 issued Sep. 10, 2002, entitled "System and Method for Reconstruction of Spectral Curves, Using Measurements from a Color Sensor and Statistical Techniques,"

It may be seen that this allows a spectrophotometer which combines the spectral differentiation capabilities of a low cost plural spectra image sensor 14 with the spectral outputs of a relatively small number of different LEDs to enable a cost effective, high performance, spectrophotometer. The following and/or other advantages may be provided: multiple measurements can be made and outputted in parallel corresponding to three or four different color image sensor outputs in parallel; cost can be reduced by reducing the number of LEDs and having lower detector and detector electronics costs; and the integration time of the three or four rows of a three or four row image sensor array can be adjusted independently to match the power levels of different LEDs.

Referencing the first line of the above table, an alternative application, function, or option is to turn on, and leave on, only the white illumination source, for all of the color test patches being read at that time, to provide a "calorimeter" function of RGB values from the chip 14 outputs.

Describing now the exemplary operation of the exemplary color sensing system 10 using an exemplary spectrophotometer 12 (with or without chips 14), as noted, certain aspects thereof are also described in above-cited references and the above cross-referenced applications.

In the illustrated example here, the spectrophotometer 12 may be utilized with circuitry, such as that of FIG. 3, or otherwise, to accurately read reflected light from one or more different color test areas such as 31 on a stationary or moving color test material such as, for example, the moving woven textile web 30 shown in FIG. 2.

As described, the disclosed spectrophotometer 12 can accurately read the colors of the test patches 31 even though the test media 30 is variably or varying spaced from or angled from the spectrophotometer 12 during their color measurements, and even though the media may be moving. Thus, the color measurements are not affected by normal variations in surface positions. This allows the simple mounting of the spectrophotometer 12 at one side of a normal media movement path, such as 40 of FIG. 2, of various color reproduction systems.

The spectrophotometer output signals may provide the input for an on-line color sensing and correction system 10, here with a microprocessor controller 100 and/or interactive circuitry and/or software. The controller 100 can also provide control or actuation signals to the spectrophotometer 12 circuitry for the spectrophotometer 12 to sequentially test or read the colors of each of the selected test patch areas 31 on the test media 30 as that test media 30 moves past the spectrophotometer 12 in the path 40.

This alternative is in contrast to those prior systems requiring removing and holding a test swatch or patch still, and moving a standard contact colorimeter or spectrophotometer over it.

A spectrophotometer calibration target area may also be provided. It may be a white, grey, black and/or other color standardized test tile or surface, such at the opposing surface 47 of FIG. 2, which can be manually inserted (or automatically solenoid inserted) into the effective field of view of the spectrophotometer 12 in the absence of test media. Individual calibration for each of the spectrophotometer's LED spectral energy outputs may be done by using a standard test target of known reflectivity for the spectrophotometer to convert each LED measurement to absolute reflectance values. This calibration can be done automatically, and without removing the spectrophotometer. Initial spectrophotometer calibration data may be stored in an integral PROM IC shipped with the spectrophotometer, if desired. Alternatively, LED output initial calibration data may be programmed into the software being used to analyze the output of the spectrophotometer in other known manners, such as loading it into other programmable memory.

The test target illumination by any one of the LEDs provides a variable level of light reflected from that target depending on the colors of the test patch area and the selected illumination source. FIG. 2 illustrates, with dashed line light rays, both the LED target area illumination and the focusing of a portion of the reflected illumination therefrom by the projection lenses 18 and 19 (a simple two-element optic in this example).

Although conventional glass or plastic lenses are illustrated in the spectrophotometer 12 of FIGS. 1 and 2, it will be appreciated that fiber optics or selfoc lenses could be utilized instead. For example, fiber optics may be used to conduct the illumination from the LEDs. Also, a collecting fiber optic may be used if desired, for example, to space the detecting photosensor remotely from the focal plane of the lenses.

As utilized in this disclosed embodiment of an on-line color sensing system 10, this low cost spectrophotometer 12, as mounted in a colored media production movement path 40, can thus be part of a color correction system to automatically control and drive to color accuracy the desired color generation, with known mathematical techniques for color error correction. That is, by recording the detectors multiple different outputs when a test patch is successively illuminated by each individual LED, the reflectance of the test patch as a function of different wavelengths can be determined, and that reflectance of the test patch, as a function of different wavelengths, can be extrapolated or interpolated over the entire visible spectra.

An accurate color control system, as disclosed herein, can thus regularly or almost constantly provide for testing and storing current color productions for on-line color control or manipulation.

To provide a desired "overfill" of the photosensors of FIG. 4, to avoid any effect of an enlarged exposure area on the imaging chip 14 from an increased target spacing from the spectrophotometer, the connecting circuitry may be set to ignore or threshold any only partially exposed cells (photosites) and/or may be set to only look at a fixed minimum number of centrally exposed cells, ignoring any signals from outer cells even if those outer cells are being illuminated by light reflected from the target.

With the differently color filtered multiple cells of the FIG. 4 chip 14, the connecting circuitry can also tell which cells are being exposed to which color from an illuminated test area. However, that is not required here. Exposing (sensing) only one single color test patch at a time, as shown in above cross-referenced applications and cited references, may be utilized with conventional single-cell photosensors.

FIG. 3 is a schematic or block diagram of an exemplary LED driver and signal processing circuits of the spectrophotometer 12 of FIGS. 1 and 2, portions of which are generally identified here for convenience as part of the controller 100, even though it could be, in whole or in part, a separate circuit, desirably having a single driver chip or die for all of the LEDs in the spectrophotometer itself. In response to regular timing signals from the circuit 110 labeled "LED Drive, Signal Capture, & Data Valid Logic" here, each LED is pulsed in turn by briefly turning on its respective transistor driver Q1 through Q4, by which the respective different spectra LEDs D1 through D4 are turned on by current from the indicated common voltage supply through respective resistors R1 through R4. Four different exemplary light output colors of the four respective LEDs are indicated in FIG. 3 by the legends next to each of those LEDs. Thus, each LED may be sequenced one at a time to sequentially transmit light though the condenser lens 13 shown in FIGS. 1 and 2.

While the LEDs in this example are turned on one at time in sequence, it will be appreciated that the system is not limited thereto. There may be measurement modes in which it is desirable to turn on more than one LED or other illumination source at once on the same target area.

As also illustrated in the circuit example of FIG. 3, at the right hand side the relative reflectance of each actuated LEDs color or wavelength may measured by conventional circuitry or software for amplifying (112) and integrating (114) the respective signal outputs of the photodiode detector array of photosites 14, as generalized by D12A and D12B in FIG. 3, and directing this integrated signal information to a sample and hold stage 116. That stage 116 can provide an output signal indicated here as Vout when released by an enabling signal input shown from circuit 110, which also provides an accompanying "Data Valid" signal.

As discussed, the corresponding LED pulsing and detector sampling rate is sufficiently non-critical and rapid for sampling each of multiple reasonable size color test patches moving by the spectrophotometer even for high speed media. However, by briefly pulsing the common LED driver voltage source to provide brief LED drive currents at a level above what is sustainable in a continuous current mode, higher flux detection signals can obtained and the test patch can thus be interrogated in a shorter time period. In any case, by integrating the signal, such as with integrator 114 here, enhanced signal to noise ratios can be achieved. It may be seen by those skilled in the art that FIG. 3 shows merely one example of a relatively simple and straightforward circuit. It, or various alternatives, can be readily implemented in an on-board hybrid chip or other architecture. Since the chip 14 of FIG. 4 has built-in electronics, the right-hand side circuitry of FIG. 3 may not be needed for its output.

An additional conventional LED light emitter and detector may be integrated or separately mounted to detect black fiduciary or timing marks printed along one edge or margin of the media 30, if desired, thereby providing an enable signal for illumination and reading within the respective color test areas. Those fiduciary marks can be used to indicate the presence of an adjacent or parallel desired test area 31 then in the field of view of the spectrophotometer 12. However, it will be appreciated that such fiducial marks may not be needed and will not be desirable on certain media.

It is well known to use conventional optical filters of different colors for each of respectively different color LED spectrophotometer target illumination sources. In particular, it is well known to use such color filters to exclude secondary emissions from LEDs, and/or to further narrow the output spectra of LED illumination sources. Such color filters are believed to be used for that purpose in some Accuracy Microsensors LED based commercial products, for example. However, it will be further appreciated by those skilled in this art that such color filters are not needed for those LEDs having sufficiently narrow bandwidths or for those LEDs which do not have secondary emissions that need to be suppressed. Therefore, filters may, but need not, be employed for the LEDs of the subject spectrophotometer.

It will also be noted that spectrophotometers have been made using illumination sources other than LEDs. For example, multiple electroluminescent (EL) emitters with filter and active layers as in HP U.S. Pat. No. 5,671,059 issued Sep. 23, 1997, or incandescent and xenon flash lamps. Also, as noted in the introduction, white (instead of narrow spectrum) LED illuminators and plural sensors with different color filters are disclosed in EP 0 921 381 A2 published 09.06.1999 for a color sensor for inspecting color print on newspaper or other printed products.

While the embodiments disclosed herein are preferred, it will be appreciated from this teaching that various alternatives, modifications, variations or improvements therein may be made by those skilled in the art, which are intended to be encompassed by the following claims.

What is claimed is:

1. A method for measuring the color of irregular surface materials, which provides dissimilar color measurements from different viewing angles, using a broad spectrum spectrophotometer, comprising: substantially perpendicular rapidly sequentially illuminating a substantially circular color test area of said irregular surface materials with a limited plural number of different spectral illuminations through a common lens system, and sequentially non-contact measuring a portion of the reflected illumination from said sequentially illuminated substantially circular color test area at an angle thereto with at least one plural color photodetector spaced from said substantial circular color test area to provide reduced angular sensitivity of said broad spectrum photodetector relative to said color test area.

2. The method of claim 1 wherein said spectrophotometer has plural said photodetectors mounted on opposing sides of said substantially circular color test area, the outputs of which are combined to further reduce said angular sensitivity relative to said color test area.

3. The method of claim 2 wherein said plural said photodetectors are relatively evenly circularly positioned around said illuminated substantially circular color test area of said irregular surface material.

4. The method of claims 1 or 2 wherein said irregular surface material is textile material moving relative to said spectrophotometer.

5. The method of claims 1 or 2 wherein said photodetectors each comprise plural photosites with plural different spectral sensitivities.

6. The method of claims 1 or 2 wherein said irregular surface material is textile material and said textile material is carpeting.

7. The method of claims 1 or 2 wherein said irregular surface material is textile material and said textile material is woven cloth.

8. The method of claims 1 or 2 wherein said irregular surface material is moving past said spectrophootometer.

9. The method of claims 1 or 2 wherein said irregular surface material is colored thread.

10. The method of claims 1 or 2 wherein said irregular surface material is colored yarn.

* * * * *